US011979341B2

(12) United States Patent
Lifshitz et al.

(10) Patent No.: US 11,979,341 B2
(45) Date of Patent: May 7, 2024

(54) ADAPTIVE MESSAGE QUEUE TIMEOUTS FOR MESSAGE QUEUES RELATED TO STORAGE SYSTEMS

(71) Applicant: Red Hat, Inc., Raleigh, NC (US)

(72) Inventors: Yuval Lifshitz, Ra'anana (IL); Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 234 days.

(21) Appl. No.: 17/487,012

(22) Filed: Sep. 28, 2021

(65) Prior Publication Data

US 2023/0100931 A1  Mar. 30, 2023

(51) Int. Cl.
*H04L 49/90* (2022.01)
*G06F 3/06* (2006.01)
*G06F 9/54* (2006.01)
*H04L 69/28* (2022.01)

(52) U.S. Cl.
CPC ............ *H04L 49/90* (2013.01); *G06F 3/0604* (2013.01); *G06F 3/0659* (2013.01); *G06F 3/067* (2013.01); *G06F 3/0679* (2013.01); *G06F 9/546* (2013.01); *H04L 69/28* (2013.01)

(58) Field of Classification Search
None
See application file for complete search history.

(56) References Cited

U.S. PATENT DOCUMENTS

| 10,656,841 | B1 * | 5/2020 | Huang .................. G06F 3/0661 |
| 2009/0006689 | A1 * | 1/2009 | Lubbers ................ G06F 3/0683 |
| | | | 710/112 |
| 2014/0026017 | A1 * | 1/2014 | Grube .................. G06F 16/182 |
| | | | 714/770 |
| 2016/0314030 | A1 * | 10/2016 | Wilson ................... G06F 9/546 |
| 2019/0155541 | A1 * | 5/2019 | Chan ..................... G06F 3/0659 |

FOREIGN PATENT DOCUMENTS

| CN | 109218109 A | 1/2019 |
| CN | 110008029 B | 7/2020 |
| CN | 107579926 B | 2/2021 |
| CN | 110417677 B | 3/2021 |
| CN | 107948090 B | 4/2021 |

OTHER PUBLICATIONS

Author Unknown, "Amazon Simple Queue Service Developer Guide," May 2021, Amazon Web Services, Inc., https://docs.aws.amazon.com/AWSSimpleQueueService/latest/SQSDeveloperGuide/sqs-dg.pdf#/welcome, 188 pages.

Author Unknown, "Ceph RGW Message Queue API for Serverless Computing," FOSDEM 2021, Feb. 6-7, 2021, https://fosdem.org/2021/schedule/event/sds_ceph_rgw_serverless/, 3 pages.

Paz, S., "Run an automated ML pipeline with CephBucket Notifications, TensorFlow and Flaskusing Openshift," Level Up Coding, Apr. 5, 2020, https://levelup.gitconnected.com/run-an-automated-ml-pipeline-with-ceph-bucket-notifications-tensorflow-and-flask-using-openshift-2ca741c29701, 7 pages.

* cited by examiner

*Primary Examiner* — Syed A Roni
(74) *Attorney, Agent, or Firm* — Dority & Manning, P.A.

(57) ABSTRACT

A first set of storage accesses of a storage system are identified. The first set of storage accesses are associated with a first user. A first plurality of storage access notifications is sent to a first message queue associated with the first user based on the first set of storage accesses. A first message queue timeout value of the first message queue is set based on at least one characteristic associated with the first set of storage accesses.

20 Claims, 5 Drawing Sheets

ADAPTIVE MESSAGE QUEUE TIMEOUTS FOR MESSAGE QUEUES RELATED TO STORAGE SYSTEMS

BACKGROUND

A data processing system may implement certain automatic processing in response to storage system activity. For example, creation of a file or object in a storage system may trigger subsequent processing, such as an index process that indexes the file or object, a transcoding process that transcodes the file or object, a copy process that copies the file or object to another storage system, or the like.

SUMMARY

The examples disclosed herein implement adaptive message queue timeouts for message queues related to storage systems. In some implementations, a set of storage system accesses of a storage system are monitored. Based on the storage system accesses, a plurality of storage access notifications are sent to a message queue. A message queue timeout value is set for the message queue based on a characteristic of the set of storage system accesses.

In one example a method is provided. The method includes identifying, by one or more processor devices, a first set of storage accesses of a storage system, the first set of storage accesses being associated with a first user. The method further includes sending, by the one or more processor devices, a first plurality of storage access notifications to a first message queue associated with the first user based on the first set of storage accesses. The method further includes setting a first message queue timeout value of the first message queue based on at least one characteristic associated with the first set of storage accesses.

In another example a computer system is provided. The computer system includes one or more processor devices of one or more computing devices. The one or more processor devices are to identify a first set of storage accesses of a storage system, the first set of storage accesses being associated with a first user. The one or more processor devices are further to send a first plurality of storage access notifications to a first message queue associated with the first user based on the first set of storage accesses. The one or more processor devices are further to set a first message queue timeout value of the first message queue based on at least one characteristic associated with the first set of storage accesses.

In another example a non-transitory computer-readable storage medium is provided. The non-transitory computer-readable storage medium includes executable instructions to cause one or more processor devices to identify a first set of storage accesses of a storage system, the first set of storage accesses being associated with a first user. The instructions further cause the one or more processor devices to send a first plurality of storage access notifications to a first message queue associated with the first user based on the first set of storage accesses. The instructions further cause the one or more processor devices to set a first message queue timeout value of the first message queue based on at least one characteristic associated with the first set of storage accesses.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
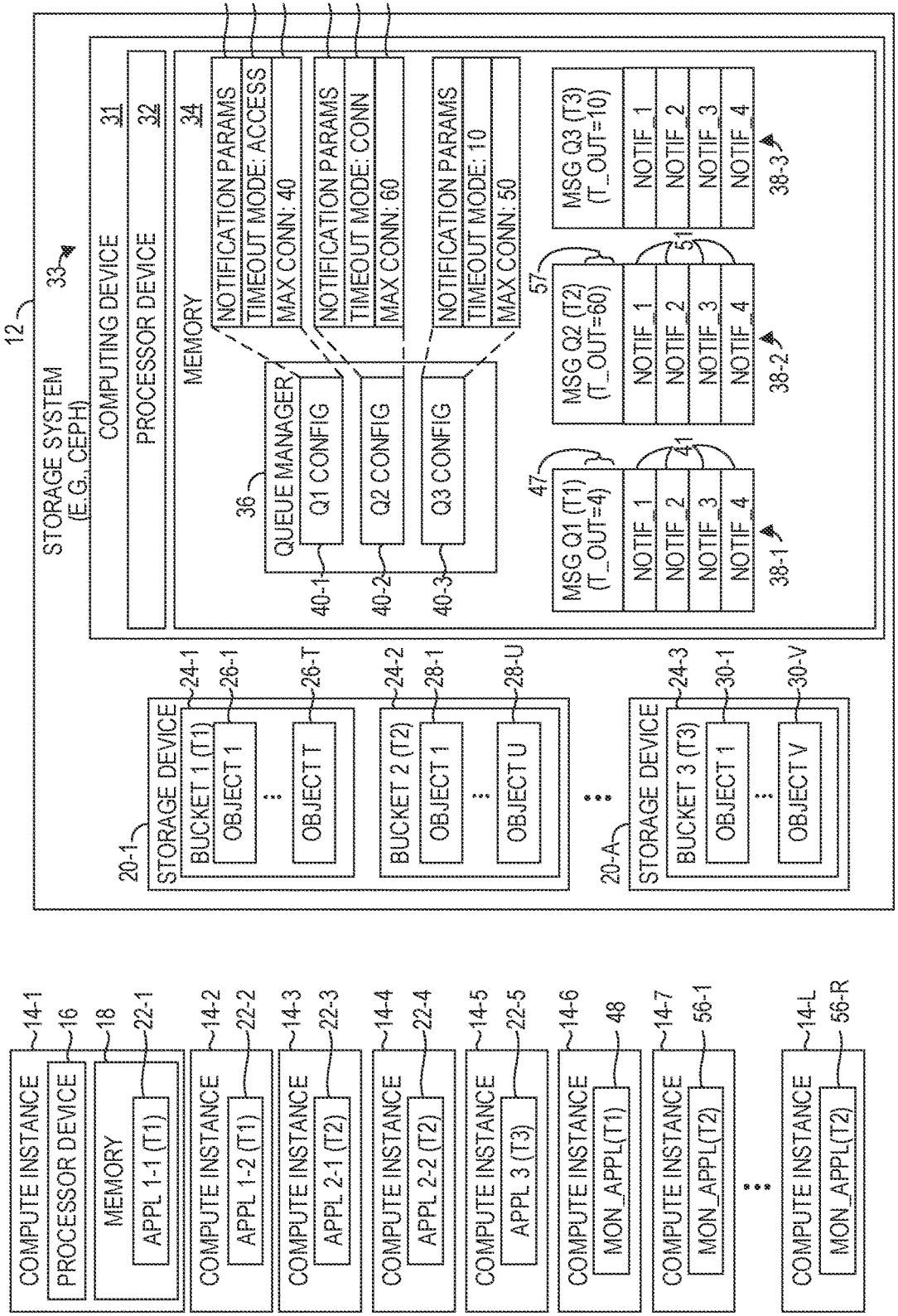
FIGS. 1A and 1B are block diagrams of an environment suitable for adaptive message queue timeouts for message queues related to storage systems according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A data processing system may implement certain automatic processing in response to storage system activity. For example, a file or object creation in a storage system may trigger subsequent processing, such as an index process that indexes the file or object, a transcoding process that transcodes the file or object, a copy process that copies the file or object to another storage system, or the like.

Certain storage systems allow users to define storage access events that, upon occurrence, cause the storage system to generate a notification. The storage system sends the notification to a message queue system that inserts the notification into a message queue that is associated with the storage access event. The association may be, by way of non-limiting example, that the storage activity is associated with a particular user, or tenant, and the message queue is also associated with that user or tenant. For example, the storage access event may have been performed against a storage unit, such as a bucket, a folder, a file, or the like, that is associated with the same user as the message queue.

An application can connect to the message queue, retrieve notifications, such as by asking (sometimes referred to as polling) the message system for any messages in the message queue, and implement a desired functionality based on each notification. For example, as discussed above, an application could connect to a message queue, determine that a new file or object was generated in the storage system, and then cause additional processing to occur, such as transcoding, indexing, or the like.

It may be desirable for some applications to retrieve the notifications in real-time, or as close to the insertion of the notification into the message queue as possible, and thus some applications may relatively continuously poll the message queue system for messages associated with a particular message queue.

Connections to a message queue system may be a finite resource. For example, connections may be network connections, and the host computer may be able to implement only a finite number of concurrent network connections. Accordingly, a message queue system may associate a message timeout with a message queue that limits the amount of time that an application can connect to the message queue. After the amount of time expires, the message queue system disconnects, or closes, the connection. The application must then incur processing to reconnect to the message queue, which takes time and then, once reconnected, implement recovery processing to determine whether additional notifications arrived during the interim period of time the application was not connected to the message queue. This process may repeat itself frequently, such as every five seconds, ten seconds, or like, depending on the message queue timeout value. This can result in a substantial amount of extraneous processing that would not occur if the application had a longer message queue timeout value and delays the receipt of notifications that occurred when the application was not connected to the message queue.

The examples disclosed herein implement adaptive message queue timeouts for message queues related to storage systems. In some implementations, a set of storage system accesses of a storage system are monitored. Based on the storage system accesses, a plurality of storage access notifications are sent to a message queue. A message queue timeout value is set for the message queue based on a characteristic of the set of storage system accesses. The message queue time value is used to cause connection timeouts of applications connected to the message queue. The message queue timeout value may be increased if the storage system accesses of the storage system increase, to reduce the amount of extraneous time otherwise necessary to reconnect to the message queue and perform recovery processing, and to enhance real-time processing in response to notifications. The message queue timeout value may be decreased if the storage system accesses of the storage system decrease, to reduce the amount of concurrent connections for this particular message queue so that such connections can be utilized elsewhere, and to reduce resources of the host computer associated with maintaining connections. Thus, the examples implement adaptable message queue timeouts based on storage system accesses of a storage system.

In another implementation, the examples implement adaptable message queue timeouts based on a number of concurrent connections to a message queue and a maximum number of connections of the message queue. The current number of connections is monitored, and as the current number of connections increases, the message queue timeout value of the message queue is reduced. As the current number of connections decreases, the message queue timeout value is increased.

FIG. 1A is a block diagram of an environment 10 according to one implementation. The environment 10 includes a storage system 12 that provides storage services to applications executing on one or more of a plurality of compute instances 14-1-14-L (generally, compute instances 14). Each compute instance 14 may comprise a computing device or a virtual machine executing on a computing device. The compute instance 14-1 includes a processor device 16 and a memory 18. In an implementation wherein the compute instance 14-1 is a virtual machine (VM), the processor device 16 and the memory 18 are implemented on a host computing device and the compute instance 14-1 has access to a portion of the processor device 16 and the memory 18 in accordance with VM virtualization mechanisms. Although not shown, the compute instances 14-2-14-L similarly have processor devices and memory. In some implementations, the compute instances 14 may be implemented as part of a cloud computing environment.

The storage system 12 includes a plurality of storage devices 20-1-20-A (generally, storage devices 20). A plurality of applications 22-1-22-5 (generally, applications 22) executing on the compute instances 14-1-14-5, respectively, utilize the storage devices 20. Each of the plurality of applications 22 may be associated with a particular user. The term "user" in this context refers to some criteria used by the storage system 12 to attribute ownership to a unit of storage, in this instance, buckets 24-1-24-3. In the context of a cloud computing environment, a user may correspond to a particular tenant or business account or to a particular user identifier. The applications 22-1 and 22-2 are associated with a tenant T1. The applications 22-1 and 22-2 perform storage accesses on the bucket 24-1 which is implemented on the storage device 20-1. The term "bucket" as used herein refers to object storage systems, where objects are stored in a non-hierarchical fashion in units referred to as "buckets". Access rights may be assigned to buckets. For example, only applications associated with the tenant T1, such as the applications 22-1 and 22-2, may have rights to access the bucket 24-1. In some implementations, the storage system 12 may be the Ceph object storage system, available at ceph.io; however, the examples are not limited to any particular object storage system. Moreover, while solely for purposes of illustration the examples are described in the context of object storage, the examples are not limited to any particular type of storage systems, and have applicability to any storage system, including, by way of non-limiting example, file storage and block storage.

The applications 22-1-22-2 may perform a variety of storage accesses of the bucket 24-1, such as object creation storage accesses, object read storage accesses, object modification storage accesses, object write storage accesses, object delete storage accesses, and the like. In this example, the storage bucket 24-1 includes a plurality of objects 26-1-26-T.

The applications 22-3-22-4 are associated with a tenant T2 and perform a variety of storage accesses of the bucket 24-2, which, in this example, includes a plurality of objects 28-1-28-U. The application 22-5 is associated with a tenant T3 and performs a variety of storage accesses of the bucket 24-3, which, in this example, includes a plurality of objects 30-1-30-V.

The storage system 12 includes a computer system 33 that includes one or more computing devices 31, each of which includes one or more processor devices 32 and one or more memories 34. A queue manager 36 maintains a plurality of message queues 38-1-38-3 (generally, message queues 38), which correspond, respectively, to buckets 24-1-24-3. The queue manager 36 maintains queue configuration records 40-1-40-3 which correspond, respectively, to the message queues 38-1-38-3. The queue configuration records 40-1-40-3 contain information that identifies when a notification 41 should be inserted into a corresponding message queue 38, what timeout mechanism should be used to time out connections to the corresponding message queue 38, and a maximum number of concurrent connections that are permitted for the corresponding message queue 38.

For example, notification parameters 42 of the queue configuration record 40-1 identify what accesses of the bucket 24-1 should cause a notification 41 to be stored in the message queue 38-1. Such actions may include for example, object creations in the bucket 24-1, object writes in the bucket 24-1, or any other desirable criteria associated with the bucket 24-1. Based on the notification parameters 42, the queue manager 36 inserts notifications 41 into the message queue 38-1 when a condition specified in the notification parameters 42 occurs. For example, if the notification parameters 42 indicate a notification 41 is to be inserted into the message queue 38-1 when an object 26 is created in the bucket 24-1, the queue manager 36 monitors accesses of the bucket 24-1 and, upon determining that a new object 26 has been created in the bucket 24-1, generates a notification 41 and inserts the notification 41 in the message queue 38-1.

A timeout mode parameter 44 identifies a timeout mechanism by which the queue manager 36 determines message queue timeout values for applications that connect to the message queue 38-1 to retrieve messages, such as the notifications 41. In this example, the timeout mode parameter 44 indicates that the timeout mechanism is based on a characteristic associated with storage device accesses of the corresponding bucket 24-1. The timeout mode parameter 44 may further indicate a particular storage device characteristic, such as a number of storage accesses of the bucket 24-1 per unit of time, a number of notifications 41 generated by the queue manager 36 in response to storage accesses per unit of time, a number of object creations per unit of time, or the like. The timeout mode parameter 44 may also identify the particular message queue timeout values based on the particular storage device characteristic. For example, the timeout mode parameter 44 may indicate that a rate of 10 object creations per second should cause the message queue timeout value to be 4 seconds, a rate of 20 object creations per second should cause the message queue timeout value to be 6 seconds, a rate of 40 object creations per second should cause the message queue timeout value to be 8 seconds, or the like. A maximum connections parameter 46 identifies a maximum number of applications that can be connected to the message queue 38-1 concurrently.

As an example of adaptive message queue timeouts for message queues related to storage systems, assume that the applications 22-1-22-2 perform a plurality of storage accesses of the bucket 24-1, such as creating, reading, writing, modifying and deleting objects in the bucket 24-1. The queue manager 36 identifies the storage accesses and, based on the storage accesses and the timeout mode parameters 44, sets a message queue timeout 47 of 4 seconds for applications connecting to the message queue 38-1.

Assume further that an application 48 associated with the tenant T1 accesses the message queue 38-1 to obtain notifications 41 about certain types of storage accesses, the occurrence of which causes the application 48 to initiate some process. As an example, upon the storage of an object 26 in the bucket 24-1, the application 48 sends a message to a transcoding process that identifies the object 26 and starts a transcoding process on the object 26.

The application 48 connects to the message queue 38-1. The connection may comprise, for example, a network connection. The queue manager 36 sets a timer that corresponds to the application 48 for four seconds. The application 48 polls the message queue 38-1 to obtain new notifications 41 as the queue manager 36 inserts notifications 41 into the message queue 38-1. The application 48 may iteratively poll the message queue 38-1 at some desired interval, such as every second, every 2 seconds, every 5 seconds, or the like. When the timer expires, the queue manager 36 closes the connection to disconnect the application 48 from the message queue 38-1. The application 48 immediately again connects to the message queue 38-1 to repeat the process.

Substantially concurrently therewith, the applications 22-1-22-2 continue to perform object creation storage accesses in the bucket 24-1; however, these object creation storage accesses occur at a greater rate per unit of time. The queue manager identifies the object creation storage accesses and, based on the object creation storage accesses and the timeout mode parameters 44, sets a message queue timeout of 8 seconds for applications connecting to the message queue 38-1 in view of the greater rate of object creation storage accesses per unit of time.

Subsequently, the application 48 connects to the message queue 38-1. The queue manager 36 sets a timer that corresponds to the application 48 for eight seconds. The application 48 polls the message queue 38-1 to obtain new notifications 41 as the queue manager 36 inserts notifications 41 into the message queue 38-1. The application 48 may iteratively poll the message queue 38-1 at some desired interval, such as every second, every 2 seconds, every 5 seconds, or the like. When the timer expires, the queue manager 36 closes the connection to disconnect the application 48 from the message queue 38-1. The application 48 immediately again connects to the message queue 38-1 to repeat the process.

At a future subsequent point in time, such as 60 minutes later, the applications 22-1-22-2 perform object creation storage accesses at a slower rate. The queue manager 36 identifies the slower rate and, in accordance with the timeout mode parameters 44, sets a message queue timeout of 2 seconds for applications connecting to the message queue 38-1 in view of the reduced rate of object creation storage accesses per unit of time.

In this manner, the queue manager 36 continuously adapts the message timeout value of the message queue 38-1 to a characteristic of the storage accesses of the bucket 24-1, such as, in this example, the rate of object creations. However, as noted above, the characteristic may comprise other events, such as a number of notifications 41 generated by the queue manager 36 in response to storage accesses, per unit of time, or the like.

Notification parameters 50 of the queue configuration record 40-2 identify what storage accesses of the bucket 24-2 should cause a notification 51 to be stored in the message queue 38-2. Again, such actions may include for example, object creations in the bucket 24-2, object writes in the bucket 24-2, or any other desirable criteria associated with the bucket 24-2. Based on the notification parameters 50, the queue manager 36 inserts notifications 51 into the message queue 38-2 when a condition specified in the notification parameters 50 occurs. For example, if the notification parameters 50 indicate a notification 51 is to be inserted into the message queue 38-2 when an object 28 is created in the bucket 24-2, the queue manager 36 monitors accesses of the bucket 24-2 and, upon determining that a new object 28 has been created in the bucket 24-2, generates a notification 51 and inserts the notification 51 in the message queue 38-2.

A timeout mode parameter 52 identifies a timeout mechanism by which the queue manager 36 determines message queue timeout values for applications that connect to the message queue 38-2 to retrieve messages, such as the notifications 51. In this example, the timeout mode parameter 52 indicates that the timeout mechanism is based on a number of concurrent connections of the message queue 38-2 and a maximum number of connections permitted for the message queue 38-2, as indicated by a maximum connections parameter 54. The timeout mode parameter 52 may further identify particular message queue timeout values for a corresponding number of concurrent connections, such as a message queue timeout value of 60 seconds for 20 or fewer concurrent connections, a message queue timeout value of 30 seconds for 21-30 concurrent connections, a message queue timeout value of 20 seconds for 31-40 concurrent connections, and a message queue timeout value of 5 seconds for 41 or more concurrent connections. In other implementations, the queue manager 36 may determine an appropriate message queue timeout value as a function of the number of concurrent connections and the maximum connections parameter 54.

As another example of adaptive message queue timeouts for message queues related to storage systems based on a number of concurrent connections, assume that the applications 22-3-22-4 perform a plurality of storage accesses of the bucket 24-2, such as creating, reading, writing, modifying and deleting objects in the bucket 24-2. The queue manager identifies the storage accesses, and, based on the storage accesses and the timeout mode parameters 52, sets a message queue timeout of 4 seconds for applications connecting to the message queue 38-2.

Assume further that a plurality of applications 56-1-56-R (generally, applications 56) associated with the tenant T2 connect to the message queue 38-2 to obtain notifications 51 about certain types of storage accesses, the occurrence of which causes one or more of the applications 56 to initiate some process. Because the timeout mode parameter 52 indicates that the timeout mechanism is based on a number of concurrent connections of the message queue 38-2 and a maximum number of connections permitted for the message queue 38-2, the queue manager 36 maintains a counter of the number of applications 56 that are currently connected to the message queue 38-2. At the point in time illustrated in FIG. 1A, the number of connections is 15. The queue manager 36 maintains a message queue timeout value 57 of the message queue 38-2 at a particular value based on the current number of connections. In this example, the queue manager 36 maintains the message queue timeout value 57 at 60 seconds. Thus, any applications 56 connected to the message queue 38-2 will be disconnected 60 seconds after they connected to the message queue 38-2.

Figure 1B:
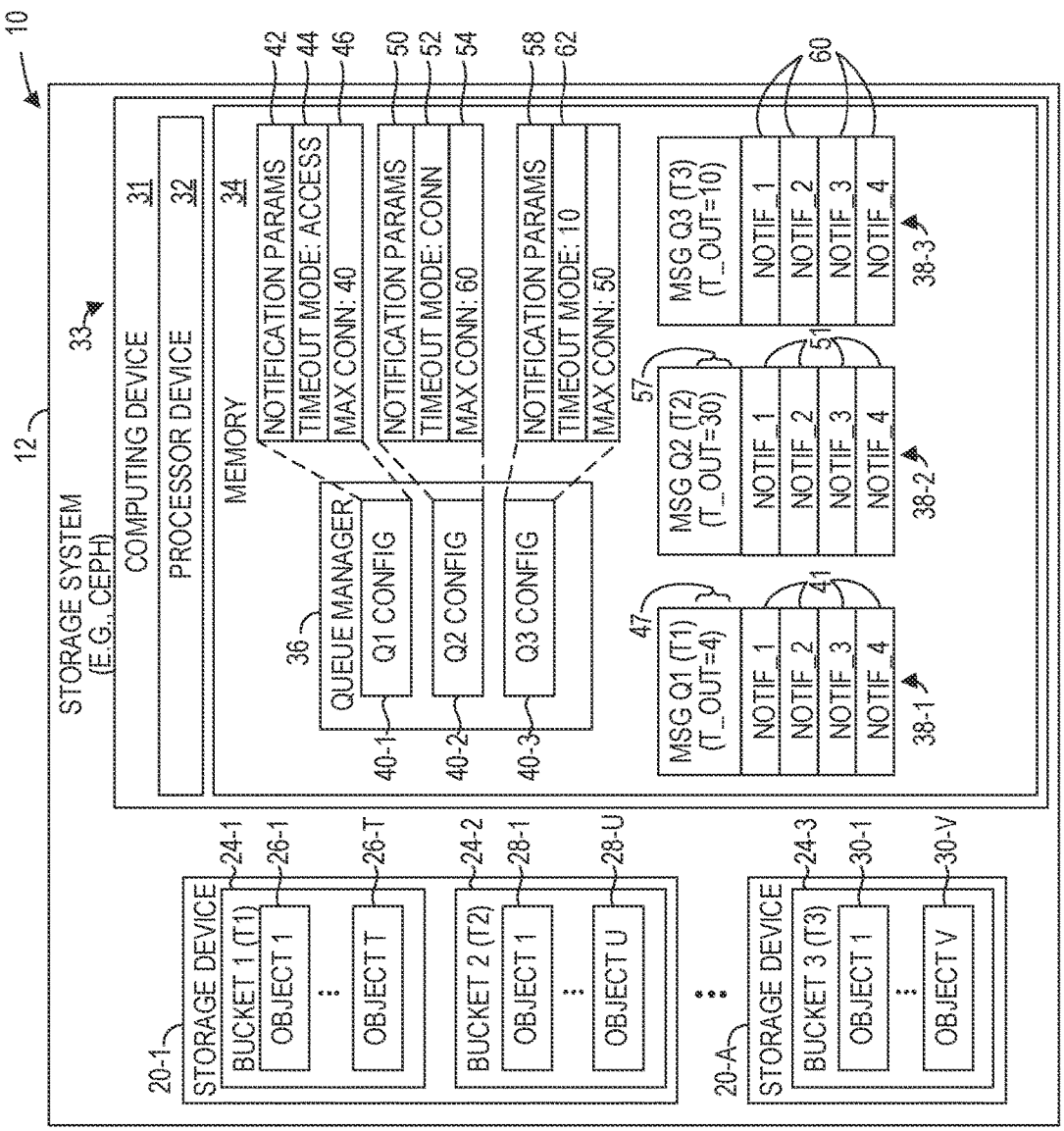

Referring now to FIG. 1B, assume that at a subsequent point in time additional applications 56 connect to the message queue 38-2, and that the plurality of applications 56-1-56-R now number 21. Based on the number of concurrent connections being 21 and the timeout mode parameter 52, the queue manager 36 sets the message queue timeout value 57 to a value of 30. Thus, any applications 56 that subsequently connect to the message queue 38-2 will be disconnected 30 seconds after they connected to the message queue 38-2.

Notification parameters 58 of the queue configuration record 40-3 identify what storage accesses of the bucket 24-3 should cause a notification 60 to be stored in the message queue 38-3. Based on the notification parameters 58, the queue manager 36 inserts notifications 60 into the message queue 38-3 when a condition specified in the notification parameters 58 occurs.

A timeout mode parameter 62 identifies a timeout mechanism by which the queue manager 36 determines timeout values for applications that connect to the message queue 38-3 to retrieve messages, such as the notifications 60. In this example, the timeout mode parameter 62 indicates that the timeout mechanism is a fixed timeout mode, and the fixed timeout value is 10 seconds. Thus, applications that connect to the message queue 38-3 are timed out after 10 seconds automatically.

It is noted that, because the queue manager 36 is a component of the one or more computing devices 31, functionality implemented by the queue manager 36 may be attributed to the one or more computing devices 31 generally. Moreover, in examples where the queue manager 36 comprises software instructions that program the one or more processor devices 32 to carry out functionality discussed herein, functionality implemented by the queue manager 36 may be attributed herein to the one or more processor devices 32.

It is further noted that while, for purposes of illustration and simplicity, the examples are illustrated as being implemented by the queue manager 36 executing on a single processor device 32, in other environments, such as a distributed and/or clustered environment, the examples may be implemented on a computer system 33 that includes a plurality of processor devices 32 of a plurality of different computing devices 31, and functionality of the queue manager 36 may be implemented on different processor devices 32 of the different computing devices 31. Thus, irrespective of the implementation, the examples may be implemented on a computer system that includes one or more processor devices of one or more computing devices.

Figure 2:
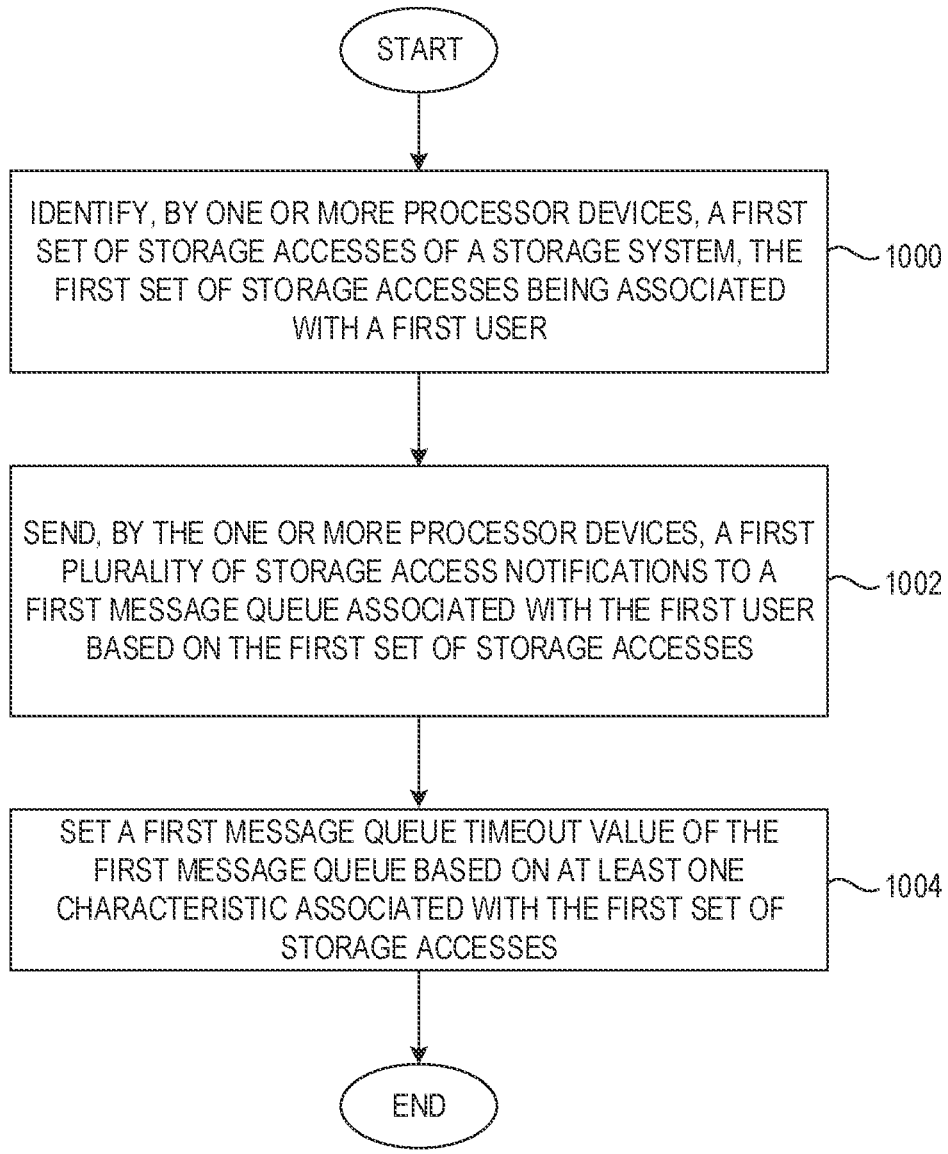
FIG. 2 is a flowchart of a method for implementing adaptive message queue timeouts for message queues related to storage systems according to one implementation.

FIG. 2 is a flowchart of a method for implementing adaptive message queue timeouts for message queues related to storage systems according to one implementation. FIG. 2 will be discussed in conjunction with FIGS. 1A and 1B. The one or more processor devices 32 identify a first set of storage accesses of the storage system 12, the first set of storage accesses being associated with a first user, in this example, the tenant T1 (FIG. 2, block 1000). The one or more processor devices 32 send a first plurality of storage access notifications 41 to the message queue 38-1 associated with the first user based on the first set of storage accesses (FIG. 2, block 1002). The one or more processor devices 32 set a message queue timeout value of the message queue 38-1 based on at least one characteristic associated with the first set of storage accesses (FIG. 2, block 1004).

Figure 3:
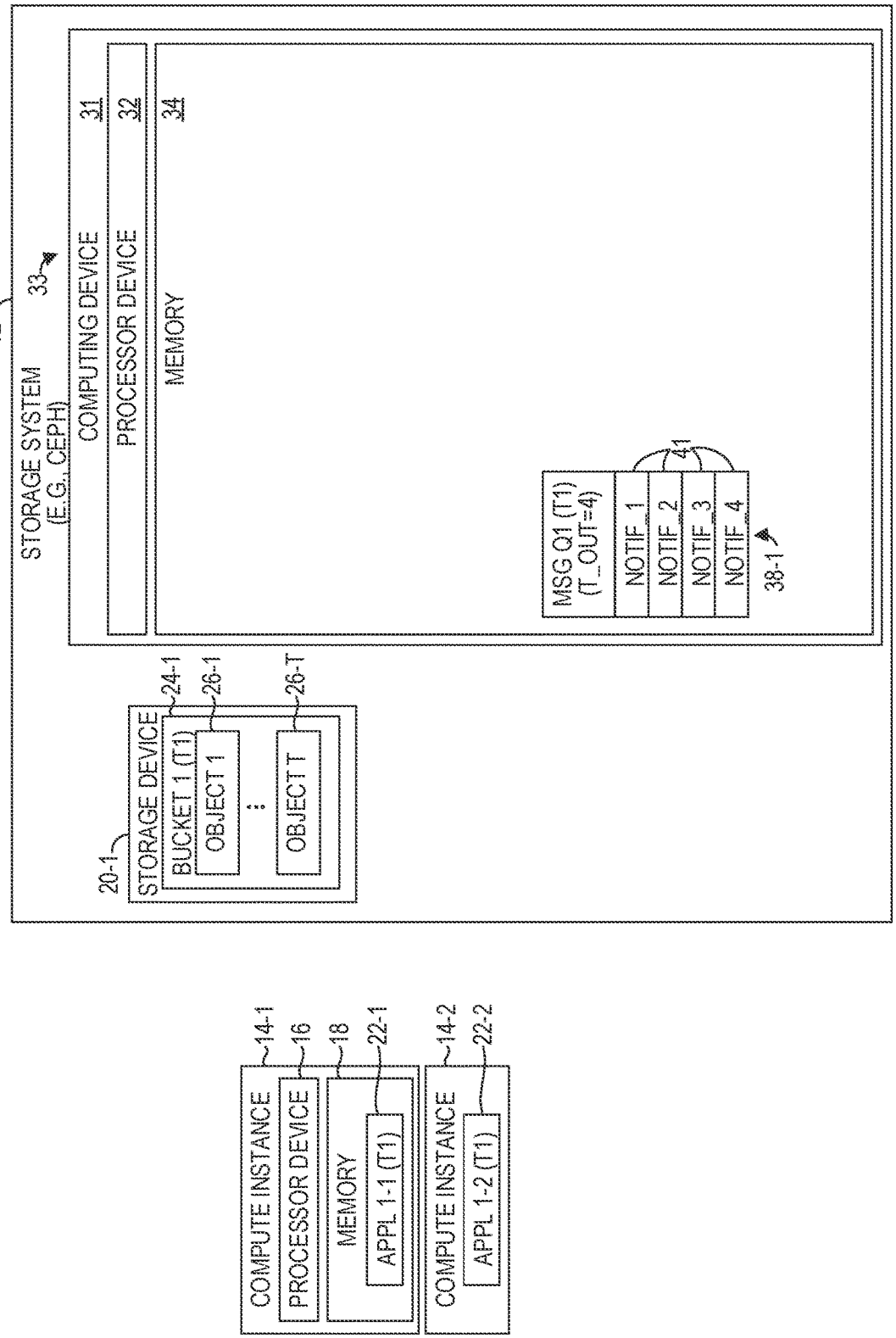
FIG. 3 is a simplified block diagram of the environment illustrated in FIGS. 1A and 1B according to one implementation.

FIG. 3 is a simplified block diagram of the environment illustrated in FIGS. 1A and 1B according to one implementation. The one or more processor devices 32 of the one or more computing devices 31 identify a set of storage accesses of the storage system 12, the set of storage accesses being associated with a user. The one or more processor devices 32 send a plurality of storage access notifications 41 to the message queue 38-1 associated with the user based on the first set of storage accesses. The one or more processor devices 32 set a message queue timeout value of the message queue 38-1 based on at least one characteristic associated with the set of storage accesses.

Figure 4:
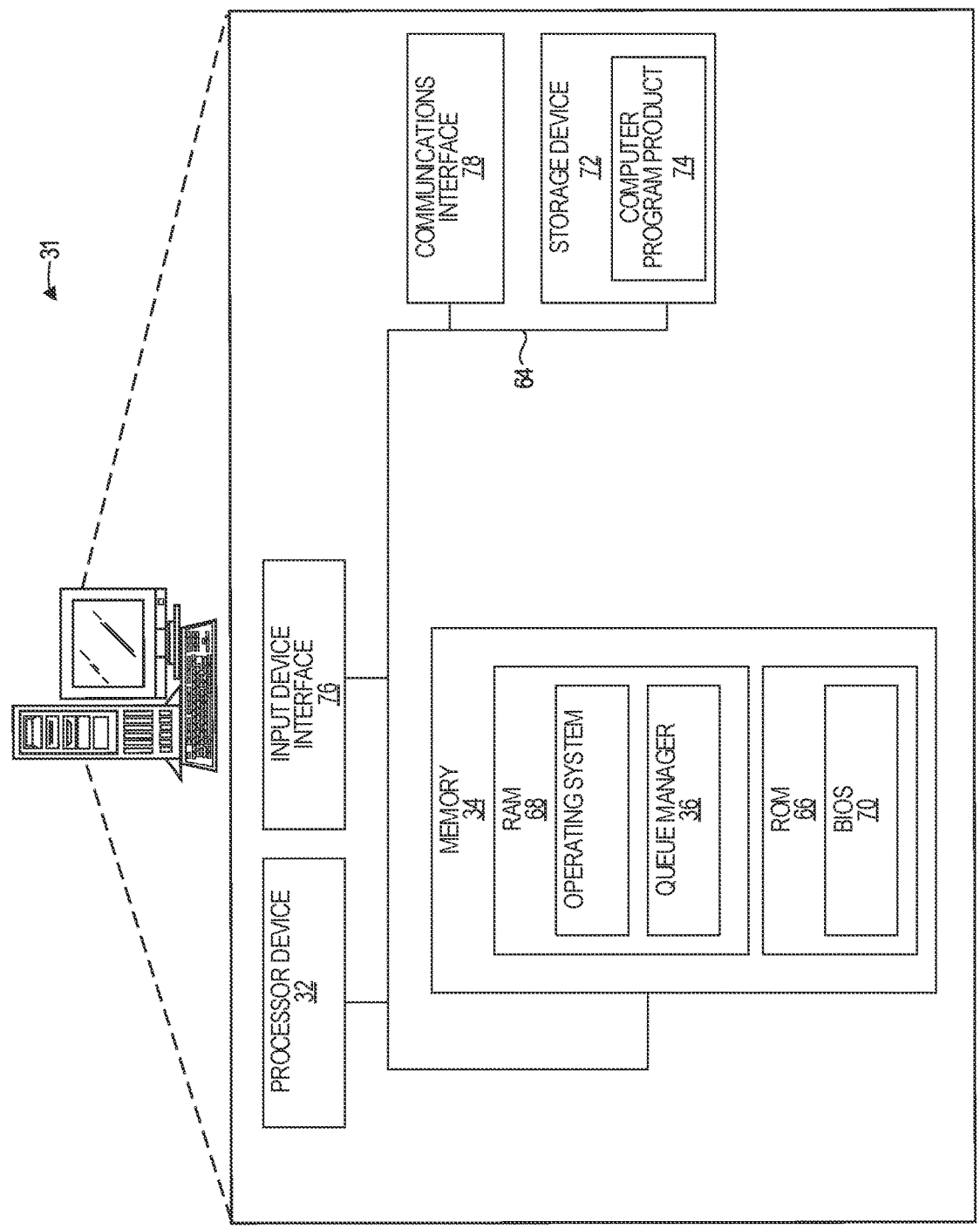
FIG. 4 is a block diagram of a computing device suitable for implementing examples according to one example.

FIG. 4 is a block diagram of the computing device 31 suitable for implementing examples according to one example. The computing device 31 may comprise any computing or electronic device capable of including firmware, hardware, and/or executing software instructions to implement the functionality described herein, such as a computer server, a desktop computing device, a laptop computing device, or the like. The computing device 31 includes the one or more processor devices 32, the system memory 34, and a system bus 64. The system bus 64 provides an interface for system components including, but not limited to, the system memory 34 and the processor device 32. The processor device 32 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 34 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 31. The volatile memory 68 may also include a high-speed RAM, such as static RAM, for caching data.

The computing device 31 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system and one or more program modules, such as the queue manager 36, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the one or more processor devices 32 to carry out the steps described herein. Thus, the computer-readable program code can comprise software instructions for implementing the functionality of the examples described herein when executed on the one or more processor devices 32. The one or more processor devices 32, in conjunction with the queue manager 36 in the volatile memory 68, may serve as a controller, or control system, for the computing device 31 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 32 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 31 may also include a communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   identifying, by one or more processor devices, a first set of storage accesses of a storage system, the first set of storage accesses being associated with a first user;
   sending, by the one or more processor devices, a first plurality of storage access notifications to a first message queue based on the first set of storage accesses, the first message queue associated with the first user and corresponding to a first configuration record; and
   setting a first message queue timeout value of the first message queue for applications that connect to the first message queue based on at least one characteristic associated with the first set of storage accesses, the at least one characteristic identified in the first configuration record.

2. The method of claim 1 further comprising:
   determining, by the one or more processor devices, that a first application associated with the first user has established a connection with the first message queue;
   setting a first message queue timer associated with the first application to the first message queue timeout value;
   determining that the first message queue timer has expired; and
   in response to determining that the first message queue timer has expired, closing the connection.

3. The method of claim 1 wherein the at least one characteristic associated with the first set of storage accesses comprises a number of storage accesses per unit of time.

4. The method of claim 1 wherein the at least one characteristic associated with the first set of storage accesses comprises a number of storage access notifications generated in response to the first set of storage accesses per unit of time.

5. The method of claim 1 wherein the first set of storage accesses are to a first bucket associated with the first user, and the at least one characteristic associated with the first set of storage accesses comprises a bucket priority.

6. The method of claim 1 wherein the at least one characteristic associated with the first set of storage accesses comprises a number of object creations per unit of time.

7. The method of claim 1 further comprising:
   identifying a second set of storage accesses of the storage system, the second set of storage accesses being associated with the first user;
   sending, by the one or more processor devices, a second plurality of storage access notifications to the first message queue associated with the first user based on the second set of storage accesses; and
   altering the first message queue timeout value based on at least one characteristic associated with the second set of storage accesses.

8. The method of claim 7 wherein the at least one characteristic associated with the first set of storage accesses comprises a number of storage accesses per unit of time characteristic and the at least one characteristic associated with the second set of storage accesses comprises the number of storage system accesses per unit of time characteristic, and wherein a number of storage system accesses per unit of time of the first set of storage accesses is greater than a number of storage system accesses per unit of time of the second set of storage accesses, and wherein altering the first message queue timeout value comprises decreasing the first message queue timeout value.

9. The method of claim 7 wherein the at least one characteristic associated with the first set of storage accesses comprises a number of storage access notifications generated in response to the first set of storage accesses per unit of time, wherein the at least one characteristic associated with the second set of storage accesses comprises a number of storage access notifications generated in response to the second set of storage accesses per unit of time, wherein the number of storage access notifications generated in response to the first set of storage accesses is greater than the number of storage access notifications generated in response to the second set of storage accesses, and wherein altering the first message queue timeout value comprises decreasing the first message queue timeout value.

10. The method of claim 1 further comprising:
identifying, by the one or more processor devices, a second message queue associated with a second user;
determining a maximum number of connections associated with the second message queue;
determining a first current number of connections of applications that are connected to the second message queue at a first time; and
based on the first current number of connections of applications that are connected to the second message queue at the first time, setting a second message queue timeout value.

11. The method of claim 10 further comprising:
determining, by the one or more processor devices, that a second application associated with the second user has established a connection with the second message queue;
setting a second message queue timer associated with the second application to the second message queue timeout value;
determining that the second message queue timer has expired; and
in response to determining that the second message queue timer has expired, closing the connection.

12. The method of claim 10 further comprising:
determining, by the one or more processor devices at a second time subsequent to the first time, a second current number of connections of applications that are connected to the second message queue at the second time, the second current number of connections being greater than the first current number of connections; and
based on the second current number of connections being greater than the first current number of connections, decreasing the second message queue timeout value.

13. The method of claim 10 further comprising:
determining, by the one or more processor devices at a second time subsequent to the first time, a second current number of connections of applications that are connected to the second message queue at the second time, the second current number of connections being less than the first current number of connections; and
based on the second current number of connections being less than the first current number of connections, increasing the second message queue timeout value.

14. A computer system comprising:
one or more processor devices of one or more computing devices, the one or more processor devices to:
identify a first set of storage accesses of a storage system, the first set of storage accesses being associated with a first user;
send a first plurality of storage access notifications to a first message queue based on the first set of storage accesses, the first message queue associated with the first user and corresponding to a first configuration record; and
set a first message queue timeout value of the first message queue for applications that connect to the first message queue based on at least one characteristic associated with the first set of storage accesses, the at least one characteristic identified in the first configuration record.

15. The computer system of claim 14 wherein the at least one characteristic associated with the first set of storage accesses comprises a number of storage access notifications generated in response to the first set of storage accesses per unit of time.

16. The computer system of claim 14 wherein the one or more processor devices are further to:
identify a second set of storage accesses of the storage system, the second set of storage accesses being associated with the first user;
send a second plurality of storage access notifications to the first message queue associated with the first user based on the second set of storage accesses; and
alter the first message queue timeout value based on at least one characteristic associated with the second set of storage accesses.

17. The computer system of claim 14 wherein the one or more processor devices are further to:
identify a second message queue associated with a second user;
determine a maximum number of connections associated with the second message queue;
determine a first current number of connections of applications that are connected to the second message queue at a first time; and
based on the first current number of connections of applications that are connected to the second message queue at the first time, set a second message queue timeout value.

18. A non-transitory computer-readable storage medium that includes executable instructions configured to cause one or more processor devices to:
identify a first set of storage accesses of a storage system, the first set of storage accesses being associated with a first user;
send a first plurality of storage access notifications to a first message queue based on the first set of storage accesses, the first message queue associated with the first user and corresponding to a first configuration record; and
set a first message queue timeout value of the first message queue for applications that connect to the first message queue based on at least one characteristic associated with the first set of storage accesses, the at least one characteristic identified in the first configuration record.

19. The non-transitory computer-readable storage medium of claim 18 wherein the instructions further cause the one or more processor devices to:
- identify a second set of storage accesses of the storage system, the second set of storage accesses being associated with the first user;
- send a second plurality of storage access notifications to the first message queue associated with the first user based on the second set of storage accesses; and
- alter the first message queue timeout value based on at least one characteristic associated with the second set of storage accesses.

20. The non-transitory computer-readable storage medium of claim 18 wherein the instructions further cause the one or more processor devices to:
- identify a second message queue associated with a second user;
- determine a maximum number of connections associated with the second message queue;
- determine a first current number of connections of applications that are connected to the second message queue at a first time; and
- based on the first current number of connections of applications that are connected to the second message queue at the first time, set a second message queue timeout value.

* * * * *